Oct. 15, 1935.  V. LANCIA  2,017,628
MEANS FOR RESILIENTLY MOUNTING ENGINES ON AUTOMOTIVE VEHICLES
Filed June 30, 1932
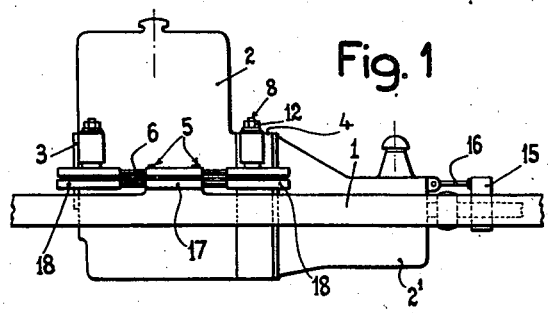
Fig. 1
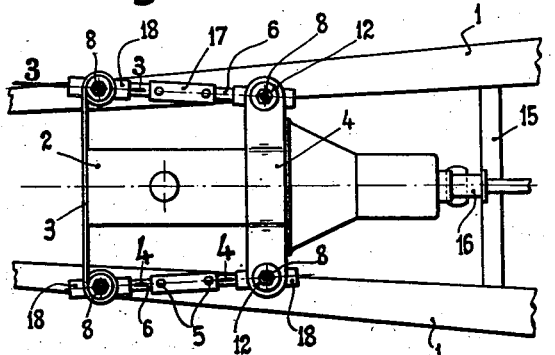
Fig. 2
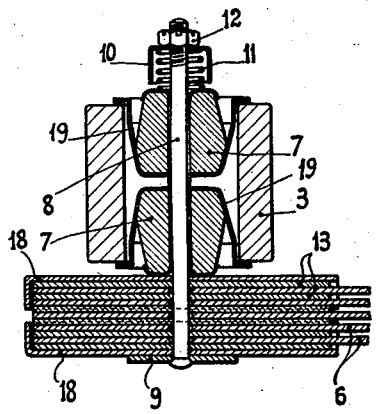
Fig. 3
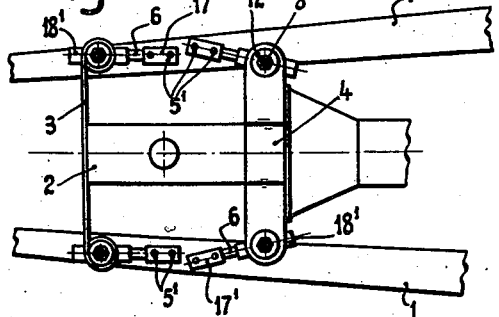
Fig. 5
Fig. 4
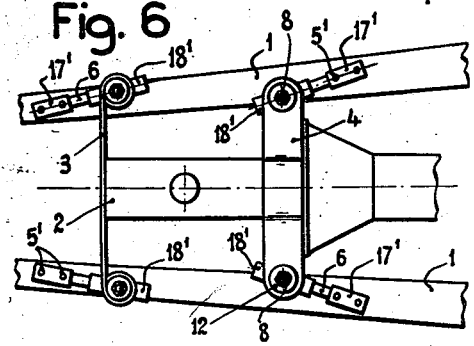
Fig. 6
Inventor:
V. Lancia Patented Oct. 15, 1935

2,017,628

UNITED STATES PATENT OFFICE 2,017,628

MEANS FOR RESILIENTLY MOUNTING ENGINES ON AUTOMOTIVE VEHICLES

Vincenzo Lancia, Turin, Italy

Application June 30, 1932, Serial No. 620,207
In Italy July 13, 1931

8 Claims. (Cl. 248—7)

This invention relates to resilient mounting of an internal combustion engine on the frame of an automotive vehicle, and it has for its object mounting means which prevent the vibrations due to the engine operation from propagating to the vehicle frame whatever are the running conditions of the engine.

Ordinary springs should not be employed for this mounting because they are set in vibration in such a manner that the vibrations are transmitted to the chassis of the vehicle.

This difficulty is overcome in accordance with this invention by having means for connecting the motor to the chassis, which is both elastic and damped. In particular, the means consist of a pack of elastic leaves mounted in a manner to permit the flexing of the leaves and in which the leaves are superposed at a distance from each other with braking or damping filling sheets interposed. All of the leaves are secured together with the damping filling sheets interposed.

In this manner the vibrations of the motor set up relative longitudinal displacements between the leaves and these displacements are damped or braked with increasing intensity. The vibrations thus become exhausted in the means of suspension and are not transmitted to the chassis.

On the annexed drawing are shown diagrammatically and by way of example some embodiments of this invention and Figure 1 is a side view of a portion of the frame of an automotive vehicle where the vehicle engine is located;

Figure 2 is a plan view of the same;

Figure 3 is a fragmentary section on an enlarged scale made on line 3—3 of Fig. 2 and showing the interconnection of one end of a spring with a connecting member carried by the engine structure;

Figure 4 is a similar section on line 4—4 of Fig. 2 of the interconnection of a spring with the vehicle frame;

Figure 5 is a diagrammatic plan view similar to Fig. 1 of a modified construction, and Figure 6 is a similar diagrammatic plan view of a further modification.

In said drawing, 1 denotes the side or longitudinal bars of the vehicle frame and 2 denotes the vehicle engine in its outline, the engine structure comprising a front transverse bar 3 and a rear transverse bar 4 fastened thereon for the purpose of mounting said engine on the vehicle frame.

In the embodiment of Figures 1 and 2 a spring 6 consisting of a number of superimposed leaves is fastened on each side bar 1 of the frame said spring having its intermediate portion embraced by strap members 17 and fastened on the frame bar 1 by means of bolts 5 passing through holes of said straps, spring and frame. Each of said springs has its ends connected with adjacent ends of transverse bars 3 and 4 of the engine by means of straps 18.

The connection of each end of springs 6 with the respective end of the engine transverse bars 3 and 4 is conveniently secured by means of a resilient member which in the construction illustrated in Figure 3 comprises two rubber pads 7 located in cups 19 engaged in a collar or seat provided by the end of the respective transverse bar 3 or 4; a bolt 8 passes through said pads, spring 6 and straps 18, and its head abuts on a reinforcing plate 9 seated on one of straps 18, while its nut 12 engages the adjacent pad 7 through a coil spring 11 enclosed within a cap 10.

Owing to this arrangement a direct contact of engine parts with suspension springs 6 is prevented and the connection is secured by the intermediary of rubber pads 7, a proper lost motion being of course provided intermediate parts 3 or 4 and 18.

The connection of springs 6 with the vehicle frame 1 is shown in Figure 4; it comprises two straps 17 embracing the spring leaves and fastened with them on the flange of frame bar 1 by means of bolts 5 passing through the parts to be interconnected.

As illustrated, the superimposed leaves 6 of each spring are spaced from each other and motion-damping members are located between the adjacent leaves in register with their points of connection with frame bar 1 and engine transverse bars 3 and 4, said dampers consisting of sheets 13 and 14 of a suitable material which may be plastic, or soft, or resilient, or may have a high friction coefficient.

Conveniently the damping means as 13 located at the engine-connected ends of the springs are of a different character with respect to dampers 14 located at the intermediate or frame-connecting point of said springs; more particularly, said engine-end dampers 13 are conveniently made of a high friction material as leather, compressed cardboard, asbestos, fabric or felt suitably treated or impregnated, or the like, while frame-coupling dampers 14 are preferably made of soft and resilient material as rubber, rubbered fabric, cork, and so on.

Thus the engine supporting spring members act to damp the engine vibrations during its operation and further the dampers 14 intermediate the spring leaves and frame prevent the propagation of residual vibrations if any to the vehicle frame.

Rubber pads 7 in turn provide a resilient cushion removing any rigid character to the connection of the engine with its suspension springs.

In the constructions where the engine has other parts, as a change-speed gear box 2', connected with it, such part 2' is conveniently connected with an adjacent frame bar as 15 by a resilient connection shown diagrammatically at 16.

Figures 5 and 6 show further embodiments of this invention in which a separate spring is used at each respective connecting point of the engine with the frame.

In the embodiment of Figure 5, four separate springs 6 are used to interconnect the ends of bars 3 and 4 of the engine 2 with the frame bars 1; each of said springs has end attaching straps 17' and 18' and bolts 5' and 8' similar to above described ones; said springs are arranged with their frame attaching point intermediate their engine attaching point.

Figure 6 shows an embodiment in which the frame attaching points of the springs are located beyond the engine attaching points of said springs.

Of course the present invention comprises all arrangements and embodiments lying within the spirit of appended claims.

What I claim as my invention and desire to secure by United States Letters Patent is:—

1. Means for resiliently mounting an engine on a vehicle frame, comprising members each consisting of a plurality of resilient leaves and adapted to be connected with said engine and said vehicle frame at points horizontally spaced from each other, frictional means intermediate said leaves, and means including resilient elements for forcing together said leaves with said intermediate frictional means for resisting relative movement of said leaves during the flexure of said member.

2. Means for resiliently mounting an engine on a vehicle frame, comprising members each consisting of a plurality of resilient leaves and adapted to be connected with said engine and said vehicle frame at points horizontally spaced from each other, damping separators and frictional means for resisting relative sliding movement between said leaves and positioned intermediate said leaves at different regions of the same, means for fastening together said leaves with said intermediate separators, and means for forcing together said leaves with said intermediate frictional means.

3. Means for resiliently mounting an engine on a vehicle frame comprising members each consisting of a set of resilient leaves, spacing resilient means intermediate said leaves at a region of the same, means for connecting said set of leaves with said frame at said region, spacing friction means intermediate said leaves at another region of the same, and means for connecting said set of leaves with said engine at last named region thereof, said last named connecting means forcing together said leaves with said intermediate friction means.

4. Means for resiliently mounting an engine on a vehicle frame comprising two sets of resilient leaves, spacing resilient means intermediate the leaves of each set at the middle region of said set, means for fastening each set at said middle region thereof on one bar of said frame, spacing friction means intermediate the registering ends of the leaves of each set, and means for connecting said registering leaf ends with said engine, said last named connecting means forcing together said leaves with said intermediate friction means.

5. Means for resiliently mounting an engine on a vehicle frame, comprising members each consisting of a plurality of resilient leaves and connected with said engine and said vehicle frame at points horizontally spaced from each other, said leaves being spaced from each other, separators intermediate said leaves at one point of connection of each member, friction strips intermediate said leaves, and means for resiliently forcing together said leaves with said intermediate friction strips.

6. Means for resiliently mounting an engine on a vehicle frame, comprising members each consisting of a plurality of resilient leaves and connected with said engine and said vehicle frame at points horizontally spaced from each other, said leaves being spaced from each other, separators made of damping material intermediate said leaves at one point of connection of each member, friction strips intermediate said leaves, and means for resiliently forcing together said leaves with said intermediate friction strips.

7. Means for resiliently mounting an engine on a vehicle frame, comprising members each consisting of a plurality of resilient leaves, said leaves being spaced from each other, damping separators intermediate adjacent leaves of each member at a region of the same, friction strips intermediate the adjacent leaves of each member, where it is free from said separators, means for forcing together said leaves with said intermediate friction strips, means for fastening each member on the vehicle frame and on the engine structure at points of said member horizontally spaced from each other, one of said fastening means engaging said member at the region thereof where said separators are located and the other fastening means engaging said member at a region where said friction strips are located between said leaves.

8. Means for resiliently mounting an engine on a vehicle frame, comprising members each consisting of a plurality of resilient leaves, said leaves being spaced from each other, damping separators intermediate adjacent leaves of each member at a region of the same, friction strips intermediate the adjacent leaves of each member, where it is free from said separators, means for fastening each member on the vehicle frame and on the engine structure at points of said member horizontally spaced from each other, one of said fastening means engaging said member at the region thereof where said separators are located and the other fastening means engaging said member at a point where said friction strips are located between said leaves, said last-named fastening means comprising resilient members for forcing together said leaves with said intermediate friction strips.

VINCENZO LANCIA.